Oct. 7, 1969     R. E. TROUNCE     3,470,997

CARTON CENTERING APPARATUS

Filed Nov. 22, 1967

INVENTOR.
RICHARD E. TROUNCE
BY
*Burton R. Turner*
ATTORNEY

United States Patent Office

3,470,997
Patented Oct. 7, 1969

3,470,997
CARTON CENTERING APPARATUS
Richard E. Trounce, Carrying Place, Ontario, Canada, assignor to Corning Glass Works, Corning, N.Y., a corporation of New York
Filed Nov. 22, 1967, Ser. No. 685,045
Int. Cl. B65g 47/26
U.S. Cl. 198—29     6 Claims

ABSTRACT OF THE DISCLOSURE

A centering device for use with conveyor belts and the like including a pair of swingable arms overlying the belt and pivotally connected together at one end through a sliding lock arrangement, so that an article conveyed along the belt will only be allowed to pass between the swingable arms by exerting equal pressure thereon, such as when the article is centered on the belt.

BACKGROUND OF THE INVENTION

When transporting articles, such as cartons or the like, along a belt or other suitable endless conveyor, it is desirable to not only orient the carton but also center it with respect to the belt width, so as to facilitate further operations such as filling, sealing, and labeling. In the past, this tedious operation was either performed by hand or by rather combersome and complex apparatus. The present apparatus, however alleviates these problems by providing a fairly simple and virtually maintenance-free automatic centering device which repeatedly centers or positions a carton or other object at any desired point across a powered endless conveyor, without requiring adjustment for carton size.

SUMMARY OF THE INVENTION

The carton centering apparatus of the present invention automatically centers each carton as it is conveyed along the conveyor belt past the centering device. A pair of spring-loaded arms are pivotally mounted on opposite sides of a conveyor with upper arm portions overlying the conveyor belt in spaced-apart relationship. The arms are connected at their lower ends in such a manner so that a force applied to either arm will lock such arm and prevent it from pivoting. When equal pressure is applied on both arms simultaneously, the connecting functions to permit both arms to pivot to their open position so that the centered article may pass therethrough.

As an off-centered article approaches the centering mechanism and contacts one arm, it locks that arm in position and slides along such arm until it makes contact with the other arm. Should the article lose contact with one of the arms, the other arm automatically locks into position and orients the article so that the sides thereof are parallel to the belt. However, as contact is established equally with both arms, the locking mechanism is released and the arms pivot to their open position allowing the centered article to continue its travel along the conveyor past the centering mechanism.

It thus has been an object of the present invention to provide improved simplified article centering apparatus for utilization with conveyor systems.

DESCRIPTION OF THE PREFERRED EMBODIMENT

Figure 1:
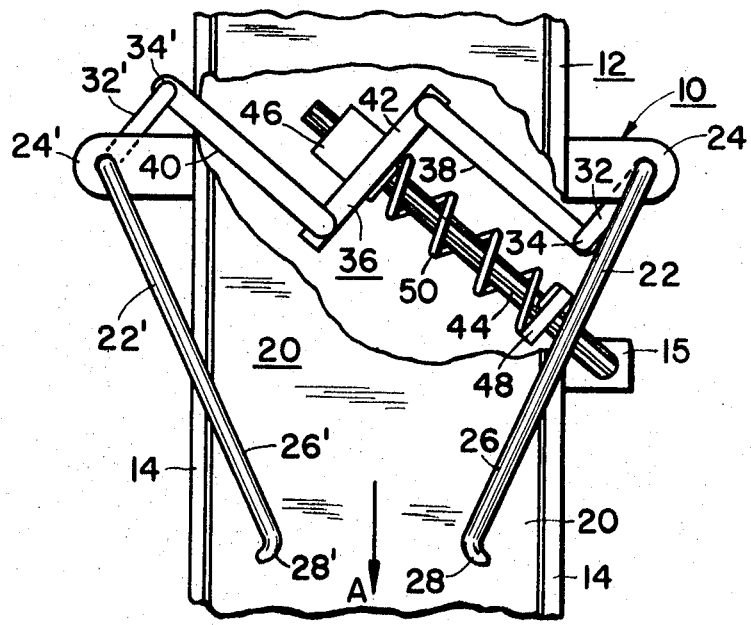
FIG. 1 is a top plan view of apparatus embodying the present invention shown in operative position with a conveyor belt, which belt has been partially cut away to show details of the operating mechanism which has been enlarged for purposes of clarity.
Figure 2:
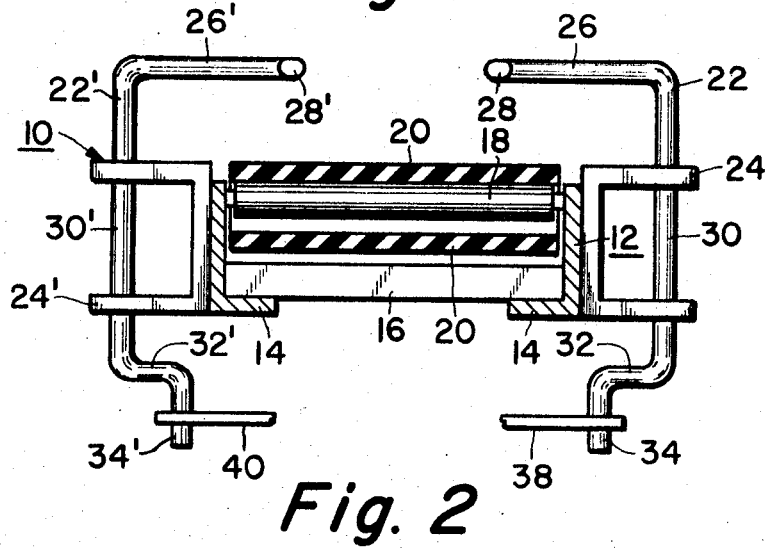
FIG. 2 is a cross-sectional elevational view of apparatus shown in FIG. 1, with the lower connecting mechanism being omitted.

Referring now to the drawings, and particularly FIGS. 1 and 2, carton centering apparatus 10 is shown positioned in operating relationship with a conveyor 12, which includes a pair of L-shaped channel members or support frames 14 positioned by tie bars 16, and a plurality of rollers 18 supporting a continuous belt 20. The carton centering apparatus 10 includes a pair of arms 22, 22' pivotally mounted in C-shaped brackets 24, 24' connected to support frames 14. Each arm 22, 22' includes an upper arm portion 26, 26' which overlies the upper surface of the belt 20. Upper arm portions 26, 26' converge from their pivotal mount toward the center of the belt at an angle of about 25° with the nose portions 28, 28' thereof terminating in spaced-apart relationship over the belt.

Each arm also has a vertically extending portion 30, 30' which pivots within the C-shaped brackets 24, 24' and is provided at its lower end with an offset crank portion 32, 32'. As shown particularly in FIG. 1, the offset crank portions 32, 32' are arranged in such a manner so that when the upper arm portions 26, 26' are pivoted outwardly in opposite directions to their open positions, such as would be occasioned when an article is conveyed in the direction of arrow A along belt 20, the offset crank portions translate such movement so that the crank tips 34, 34' move in substantially the same direction.

An operating mechanism means 36 operatively connects the arm 22, 22' together for unified movement. The mechanism includes a pair of connecting links 38, 40, which are respectively pivotally connected at one end to crank tips 34, 34'. The connecting links 38, 40 have their other ends pivotally connected to opposite ends of a slide bar 42, which is slidably mounted on a fixed shaft 44. The shaft 44 is fixed to a portion 15 of the conveyor frame, such as by welding, and has a pair of end-stop 46, 48 which limit the travel of the slide bar 42 along shaft 44. A return spring 50 is provided about shaft 44 between stop collar 48 and the slide bar 42 to return the mechanisms to its initial position after an article has passed between arms 22, 22'.

The slide bar 42 is constructed so that, when normal to the axis of shaft 44, it may be easily slid along the shaft against the rather small force exerted by spring 50. However, when an uneven force is exerted on either end of the bar 42 by the connecting links 38, 40, the bar will cock or become skew to the axis of the shaft, and accordingly will bind thereon and prevent sliding motion of the bar on the shaft. Since the shaft 44 is fixed to the conveyor frame 15, the binding of the slide bar 42 thereon effectively locks the mechanism and prevents further pivotal motion of the arms 22, 22'.

However, as the article proceeds along the locked arm, it becomes centered on the belt and makes contact with the opposite arm. When an equal force is applied to each end of the slide bar 42 through the crank linkage 32, 38 and 32', 40, the bar is free to slide along the shaft 44 against the small opposing action of the return spring 50. As a result, the upper arm portions 26, 26' uniformly pivot outwardly to allow a centered article to pass therethrough and continue its travel along conveyor belt 20. The spring 50 not only functions to provide sufficient opposing force to initiate the locking action during centering, but also to supply the necessary force to return slide bar 42 to its initial position against end stop collar 46, thus pivoting upper arm portions 26, 26' back to their initial converging starting position over belt 20.

In operation, as an off-centered article contacts one of the upper arm positions, such as 26, it will tend to pivot the arm outwardly transmitting a force through crank portion 32 and connecting link 38 to one end of slide bar 42. Such force will cause the bar 42 to cock and bind on shaft 44 and thereby lock arm 22 in a closed position. However, as the article slides downwardly along arm portion 26 toward a centering position, it will ultimately contact arm 26' and exert a force through crank portion 32' and connecting link 40 to the opposite end of the slide bar 42. When the force applied to both arms is equal, an equal force will be applied on the opposite ends of slide bar 42 so that it will freely slide along shaft 44 against the action of compression spring 50 and allow the upper arm portions 26, 26' to pivot outwardly into their open position. As the centered article passes beyond nose portions 28, 28' spring 50 will urge the slide bar 42 back to its initial position against collar 46 and through the connecting-crank mechanism will pivot upper arm portions 26, 26' back to their initial converging starting position over belt 20.

Figure 3:
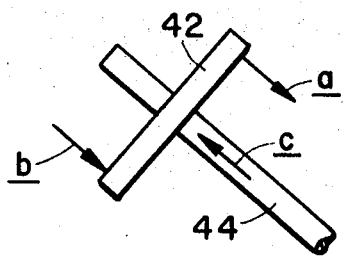
FIG. 3 is a somewhat schematic view showing the relationship of the forces applied to the operating mechanism.

The forces applied to slide bar 42 are shown by the arrows in FIG. 3. When the forces applied by arrows $a$ and $b$ are equal, the bar 42 will remain normal to the axis of shaft 44 and easily slide against the small force applied by the compression spring as represented by arrow $c$. However, when the forces applied by arrow $a$ and $b$ are unequal, it can be seen that the bar 42 will have a tendency to cock or become skew on the shaft 44, thus producing a binding action which will prevent a sliding motion.

Although I have disclosed the now preferred embodiment of my invention, it will be apparent to those skilled in the art that various changes and modifications may be made thereto.

I claim:

1. Apparatus for automatically positioning a plurality of successively presented articles transported along a conveyor which comprises, conveyor means, a pair of pivotally mounted arms each having an upper arm portion overlying a portion of said conveyor means so as to engage an article conveyed therealong, operating mechanism means connecting said pivotally mounted arms together for effecting a uniform pivotal opening of said arms responsive to uniform forces applied to said upper arm portions by a conveyed article, said operating mechanism means including a fixed shaft, slide bar means slidably mounted on said fixed shaft, and means connecting end portions of said slide bar means to said pivotally mounted arms for relatively transferring forces applied to said upper arm portions by a conveyed article to end portions of said slide bar means and permitting said arms to open when equal forces are applied thereto.

2. Apparatus as defined in claim 1 wherein said slide bar means is mounted on said fixed shaft for binding engagement therewith when unequal forces are applied to end portions of said bar means.

3. Apparatus for automatically positioning a plurality of successively presented articles transported along a conveyor which comprises, conveyor means, a pair of pivotally mounted arms each having an upper arm portion overlying a portion of said conveyor means so as to engage an article conveyed therealong, said arms being pivotally mounted on opposite sides of said conveyor means, an offset crank portion formed on each arm, a fixed shaft secured to said conveyor means, means mounted on said shaft for sliding movement there along when normal to the longitudinal axis thereof and bindable on said shaft when skew to such axis, and connecting means connecting end portions of said slidable means to said offset crank portions for providing unified movement of said pivotally mounted arms.

4. Apparatus for automatically positioning a plurality of successively presented articles transported along a conveyor which comprises, conveyor means, a pair of pivotally mounted arms each having an upper arm portion overlying a portion of said conveyor means so as to engage an article conveyed therealong, operating mechanism means connecting said pivotally mounted arms together for effecting a uniform pivotal opening of said arms responsive to uniform forces applied to said upper arm portions by a conveyed article, said operating mechanism means including a fixed shaft having a slide bar slidable therealong intermediate end portions thereof, said slide bar being mounted on said shaft so as to slide therealong when normal to the longitudinal axis of the shaft and to bind thereon when skew to such axis, a first connecting link connecting one end of said slide bar to one of said arms, and a second connecting link connecting the opposite end of said slide bar to the other of said arms.

5. Apparatus as defined in claim 4 wherein each of said pivotally mounted arms has an offset crank portion arranged in such a manner so that when said arms are open the crank portions will move in substantially the same direction, and said first and second connecting links being secured to the offset crank portion of their respective arms so that equal forces applied to each arm will be transmitted to each end of said slide bar causing the same to slide along said shaft and permitting said upper arm portions to pivot outwardly to their open position.

6. Apparatus as defined in claim 4 wherein a return spring is positioned on said fixed shaft between a stop collar and said slide bar to urge said slide bar toward its initial operating position.

References Cited

UNITED STATES PATENTS 2,781,119   2/1957   Talbot _____ 198—29

RICHARD E. AEGERTER, Primary Examiner